Figure 3:
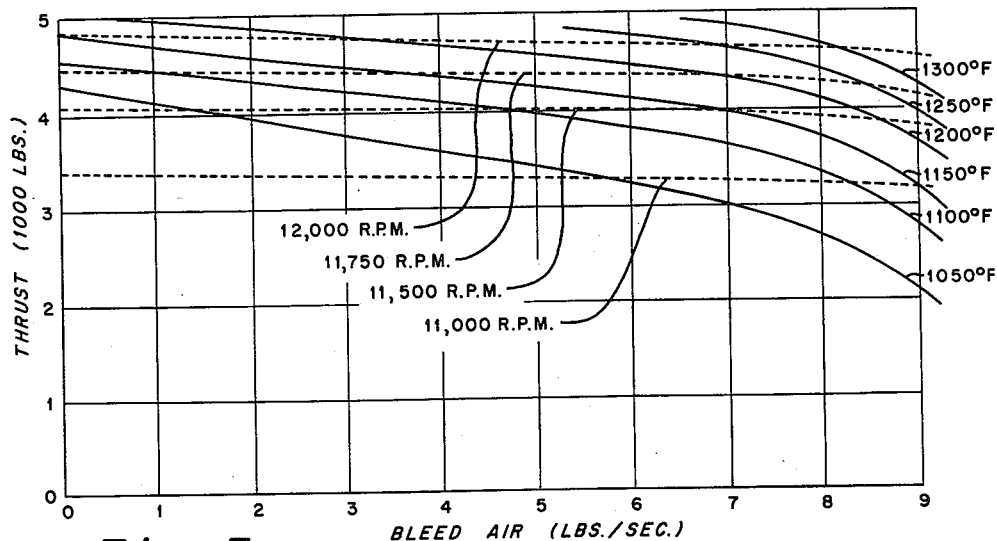

Jan. 30, 1962  E. MERKIN  3,018,691
JET-STREAM SPOILER
Filed June 20, 1957  2 Sheets-Sheet 1
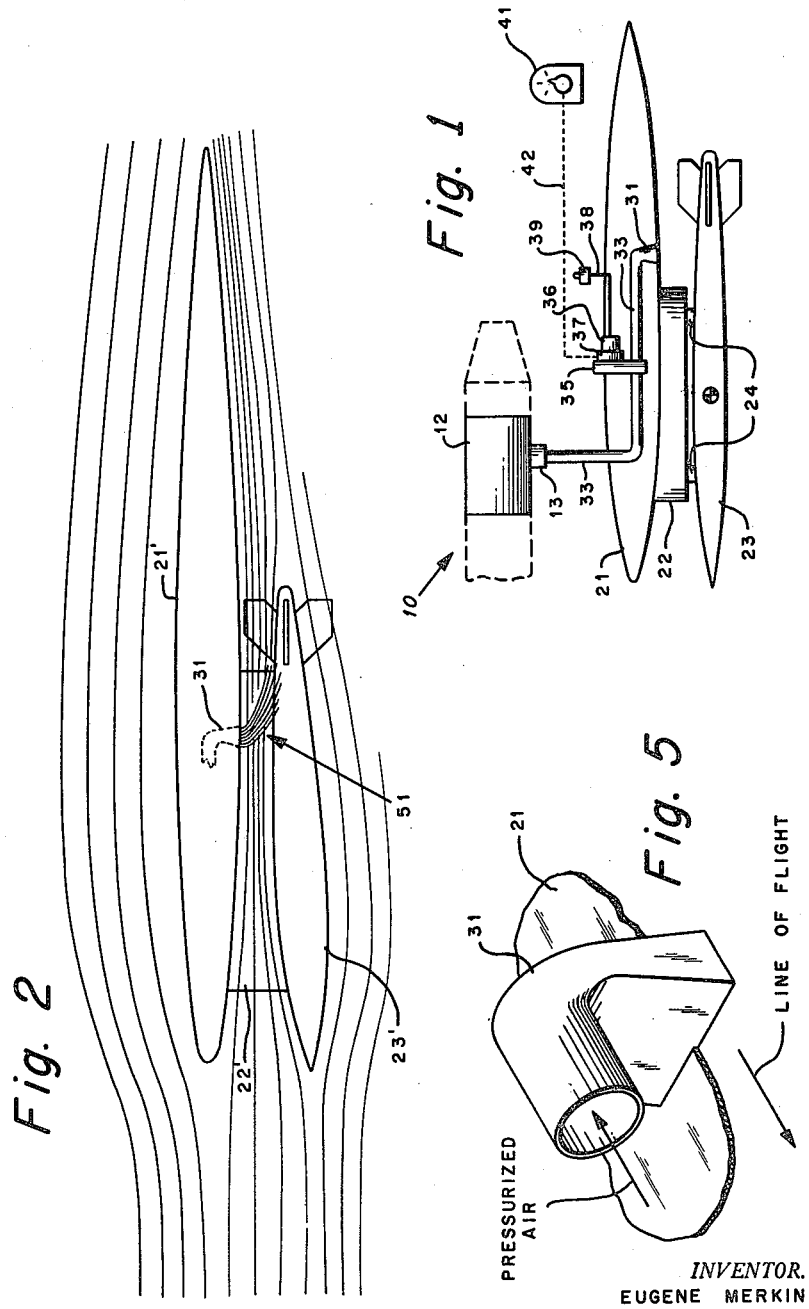
INVENTOR.
EUGENE MERKIN
BY
ATTORNEYS

INVENTOR.
EUGENE MERKIN patented Jan. 30, 1962

**3,018,691
JET-STREAM SPOILER**
Eugene Merkin, Huntingdon Valley, Pa., assignor to the United States of America as represented by the Secretary of the Navy
Filed June 20, 1957, Ser. No. 667,059
4 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This invention relates to a jet-stream spoiler and more particularly to a jet-stream spoiler for improved store breakaway characteristics for airborne stores, which is housed entirely within the external contours of an aircraft.

With the advent of many types of aircraft capable of sustained performance at speeds substantially in excess of Mach 1, the necessity for store ejection means effective at such speed has become critical, since airborne stores such as bombs or projectiles released from an aircraft at very high speeds typically demonstrate a pronounced nose-down pitching moment at the instant of release, which frequently results in collision between the afterend of the store and a structural element of the releasing aircraft with resultant damage to both. Two aerodynamic characteristics apparently contribute to the generation of such nose-down pitching moments. The first is the existence of a negative pressure field between the undersurface of an aircraft and a store supported thereunder, starting somewhat forward of the center of gravity of the store and extending to the afterend thereof. This negative pressure is conceivably induced by venturi action of the ambient air stream. The second aerodynamic characteristic involves the presence of an upward deflection of the air stream adjacent to the store such that the resulting vertical force components of the air stream impinging on the tail fin assembly of the store also tend to impart a tail high attitude to the store at the instant of its release.

While various types of store ejector mechanisms have long been known, including mechanically actuated assemblies and explosively operated devices, such arrangements are typically bulky installations of relatively complex design, the use of which exacts a severe weight and space penalty. In addition, they typically include portions disposed externally of the faired outer surface of an aircraft for direct engagement with the store and include expendable portions normally discharged with the store, which must then be replaced during each rearming operation. Moreover, the explosive devices frequently favored tend to exert large concentrated forces on the adjoining aircraft structure as well as upon the store ejected thereby. Finally, such explosive devices are prone to malfunction unless thoroughly cleaned and adjusted after each use and pose a continuing threat to personnel by virtue of their explosive contents.

In contrast to the store ejection means referred to above the instant invention contemplates a reliable, compact, lightweight store ejection device composed of a limited number of lightweight structural elements fully enclosed within the external contours of an aircraft without either mechanical or explosive ejection means in direct contact with the store and capable of repeated re-use with a minimum of maintenance. In particular, the instant invention provides means for directing a sonic jet stream against a store suspended from an aircraft to create a favorable change in the aerodynamic characteristics thereof during the critical interval in which it is released from the supporting aircraft. Moreover, since the jet stream of the instant invention must be directed against the rearward end of an externally mounted store to overcome a nose-down pitching moment thereof, the jet-stream spoiler of the instant invention offers a further advantage in that the jet stream inevitably impinges upon the tail fin assembly of the store, thereby providing a further compensating factor in the store's pitching characteristics.

An object of the instant invention is the provision of a jet-stream spoiler for producing favorable aerodynamic flow conditions between the undersurface of an aircraft and a store suspended therefrom, thereby eliminating a nose-down pitching moment on the store at the instant of release, due to the normally encountered adverse aerodynamic flow conditions.

Another object is the provision of means for assuring enhanced performance of a store released from an aircraft at very high speeds without the application of concentrated force either to the structure of an aircraft or to a store released therefrom.

Yet another object is to provide a means for controlling the release of a store from an aircraft at high speeds which incorporates no expendable parts.

A final object of the instant invention is to provide means for eliminating adverse pitching moments in a store released at high speed from an aircraft, making use of turbojet compressor bleed-off air as a source of a high momentum jet stream.

Figure 4:
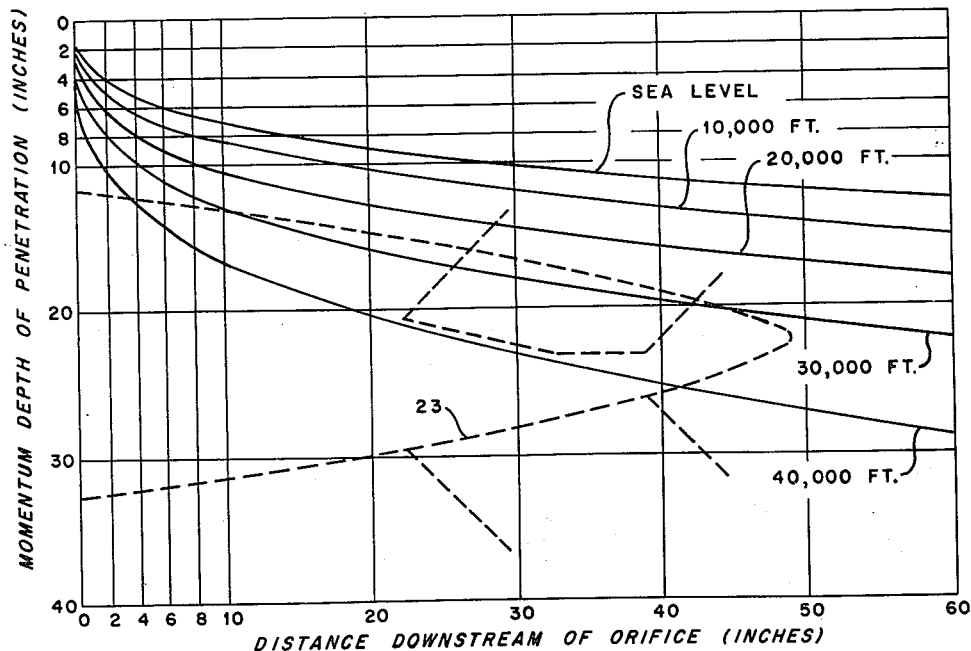

Other objects and advantages of the instant invention will become readily apparent upon further consideration of the following description thereof, taken with the showing in the accompanying drawings wherein:

FIG. 1 shows a schematized representation of a preferred embodiment of the instant invention, FIG. 2 illustrates the aerodynamic flow about a typical store installation as modified by the preferred embodiment of the instant invention, FIG. 3 is a graphic representation of variations in engine characteristics with turbojet compressor bleed, FIG. 4 is a graphic illustration of the momentum depth of penetration versus the mixing distance for a given orifice diameter, and FIG. 5 is an isometric detailed view, partially broken away, of a representative orifice assembly shown in relation to an aircraft outer surface.

Referring now to the drawings wherein like reference numerals refer to like or corresponding parts throughout the several views, FIG. 1 includes a schematic representation generally designated by the reference numeral 10 of a turbojet engine assembly of the type suitable for use as an aircraft propulsion unit, which includes a suitable compressor assemly 12 such as a multi-stage axial compressor provided with a compressor air-bleed assembly 13 located so that it provides compressor bleed air at the desired pressure for the purpose of the instant invention. In addition, FIG. 1 includes a schematic representation of a side elevation of an aircraft wing or fuselage 21 provided on its lower surface with a suitable store supporting means or pylon 22 to which a store 23 such as a bomb or projectile is releasably secured by a conventional bomb rack or shackle assembly including one or more latch mechanisms 24, not illustrated in detail since such mechanisms are well known and hence are not considered part of the instant invention. Finally, FIG. 1 schematically illustrates the essential elements of the instant invention including a sonic orifice assembly 31 mounted flush with the undersurface of an aircraft fuselage or wing 21 and arranged to direct a jet stream substantially perpendicular to the existing air flow adjacent the undersurface of the element 21, said orifice, located relatively rearwardly of the center of gravity of store 23, being connected by means of relatively small diameter lightweight ducting 33 to the compressor air bleed assembly 13 through a conventional slide valve assembly 35 actuated by a reversible electric motor 36 through a gear box 37, and preferably controlled by a remotely disposed control means 39 therefor such as a switch assembly operatively conected to motor 36 by suitable electrical connecting means 38. In most installations a single size of valve opening will suffice for all operating conditions. However, where operating conditions vary widely, the gear box 37 may be modified to include a conventional speed changing mechanism connected to a valve opening position selector 41 by any suitable connecting means such as a mechanical or hydraulically actuated linkage 42. Similarly the valve assembly 35 may be mechanically actuated and be remotely controlled through a mechanical or hydraulically actuated linkage. Moreover, the manually operated valve opening position selector illustrated in FIG. 1 may be rendered automatically operable by incorporating therein a pressure sensitive element responsive to changing operating conditions and operable to select the proper valve opening position automatically.

Although the orifice is described above as directing the jet stream normal to the free stream, since this configuration makes for cleanness and simplicity of design, as indicated in FIG. 5, the jet stream may also exert a favorable influence when it is disposed either parallel to the free stream or at an angle therewith between 0 degree and 90 degrees.

While the reference numeral 35 designates a slide or gate valve assembly for flow control through the ducts 33, it is understood that a conventional valve assembly effecting pressure control as well as flow control may be resorted to in order to provide the proper pressure level at the sonic orifice assembly 31. In addition, in order to minimize the bleed-off time the control means 39 may be incorporated in or coordinated with the arming switch for the bomb rack or shackle assembly including the latch mechanisms 24 housed within pylon 22.

Considering next the showing in FIG. 2, including a cross-sectional representation of a wing airfoil 21' beneath which a store 23' is suspended by means of a pylon assembly 22' housing a bomb rack assembly including latch mechanisms 24, it will be noted upon consideration of the representation of normal flow lines around the airfoil section 21' and the store 23' suspended therefrom that the flow immediately beneath the airfoil section 21' tending to maintain a low pressure condition over the rearward portion of the store 23' is substantially modified by the introduction of the additional jet stream, substantially perpendicular thereto, from the sonic nozzle assembly 31. This additional jet stream is represented in FIG. 2 by a group of streamlines generally designated by the reference numeral 51.

From the showing in FIG. 3 of significant performance characteristics of a typical turbojet aircraft power plant with compressor bleed, it will be apparent that the reduction in thrust attributable to compressor bleed is not serious especially since the time interval required for separation of a store from an aircraft is only of the order of .10 to .20 second. Hence, operation of the compressor bleed for the purpose of ejecting a store in conformance with the teachings of the instant invention will not result in a significant reduction in the performance of an aircraft upon which this feature is incorporated. Moreover, in an aircraft already embodying boundary layer control means in the wing structure, the additional structure necessary for incorporation of the instant invention will be minimized.

FIG. 4 illustrates a series of curves representing the relationship between the momentum depth of penetration and the mixing distance at various flight altitudes, and in addition, includes a representation of a portion of a typical store 23 suspended from a given aircraft the after portion of which is so disposed, as illustrated in FIG. 4, that the jet stream discharged from the orifice of the instant invention, located at 0 in FIG. 4, impinges upon the tail fin assembly of the store in the manner noted above to assist in counteracting the nose-down pitching moments of the store at the instant of release.

While the illustrative embodiment of the instant invention shows a turbojet compressor bleed-off as the source of high pressure air to be discharged from the orifice assembly 31, it is to be understood that other suitable sources of high pressure gases may be used for this purpose including a high pressure reservoir, a ram air duct intake, an auxiliary compressor assembly or any other suitable source of high pressure gases operable over a relatively short interval.

In operation, the device of the instant invention may be actuated conveniently in coordination with means for arming the bomb rack assembly including latch mechanisms 24 during the short interval necessary for the release of a store 23 therefrom, which interval, as noted above, extends over a small fraction of a second. This coordination is facilitated when the valve assembly is electrically controlled as indicated in FIG. 1, since the means for arming the bomb rack assembly is commonly controlled by an electrical circuit. During this interval the control means 39 or its equivalent is operated to transmit a suitable impulse through the connecting means 37 to the motor 36 to open the valve assembly 35 and thereby permit a flow of compressor bleed air through the duct 33 and thence through the sonic orifice assembly 31, during the brief interval commencing immediately before the store 23 is released from the pylon 22 and continuing only until the breakaway of the store from the aircraft is completed. Immediately thereafter, operation of the control means 39 may be terminated with reversed operation of the motor 36 so that the control valve 35 regulated thereby cuts off the flow of air through the orifice assembly 31.

The cross-sectional area of the sonic orifice 31, and the quantity of air discharged from this orifice may be varied as necessary to produce the requisite jet stream, taking into account the spacing of the store beneath the lower surface of the aircraft as well as the size, shape, and weight of the store to be acted on by the device comprising the instant invention. While the sonic orifice 31 may be a simple circular opening, at least for use with relatively small stores, its capabilities for the intended purposes of the instant invention will be enhanced if it is elongated laterally of the store to form an elliptical or a rectangular opening, as shown in FIG. 5, for example. In fact, such a rectangular opening may be so far elongated that it may properly be characterized as a slotted opening which may be so disposed relative to a store that the jet stream discharged through the opening impinges on substantially the entire lateral dimension of the store. In this manner the most effective spanwise jet stream expansion may be provided to adequately influence the store pitching moment.

In addition to the basic capability of the instant invention for overcoming a nose-down pitching moment, it may also be arranged to reduce side loads and yawing moments of a store simultaneously with its effect on the pitching moment thereof. This additional capability may be provided as necessary by appropriately positioning the orifice so that the jet stream discharged therefrom has a component of force in the desired direction other than the vertical plane in which it acts solely upon the pitching moment of a store. Such modified positioning of the orifice could consist of relocating it offset to either side of the store center line and, in addition, may include coordinated angular displacement of the orifice from a vertical position to direct the jet stream laterally as well as downwardly toward a store from an offset position.

For the sake of sufficient flexibility as to the types of stores which may be successfully released from a given pylon installation it may be necessary to provide interchangeable orifice assemblies at a given location relative to the pylon or a multiplicity of orifice assemblies at spaced locations selectively operated by a plurality of individual control means therefor so that only the appropriate orifice is used in conjunction with a given store.

Since it has been noted as a result of experimental work in the field of aerodynamics that the addition of a moderate amount of heat to a supersonic air stream appreciably increases the lift of an airfoil exposed thereto, the fact that the jet stream discharged from the orifice of the instant invention may in fact be at a temperature level higher than that of the ambient air stream will have a favorable effect on the operation of the instant invention inasmuch as this jet stream will impinge on the tail fin assembly of a store in the manner illustrated in FIG. 4. While the favorable temperature gradient noted above may be incident to the use of compressor bleed air from a turbojet engine, this favorable gradient may be enhanced by the deliberate introduction of additional heat into the jet stream prior to its discharge from the orifice, as by providing a heating element adjacent to or encircling the duct 33.

While the teachings of the instant invention have been illustrated and described above as applied to a store mounted externally beneath the undersurface of an aircraft, it is to be understood that these teachings are equally applicable to stores suspended within an aircraft as within a bomb bay where similar difficulty with respect to instability of the stores may be encountered at very high flight speeds. No showing of this variation of the teachings in the instant invention is provided here since the exact location, configuration and orientation of such an orifice assembly relative to a store mounted within an aircraft would depend on many variables including the size and shape of the bomb bay area as affecting the flow around stores carried therein immediately before and during the release operation, as well as upon the size, shape and weight of these stores themselves. However, since it is a well-known characteristic of stores released from a bomb bay as well as externally mounted stores released from beneath an aircraft at very high speeds that the stores develop an abrupt nose-down pitching moment immediately upon their release in many existing bomb bay installations, the teachings of the instant invention can similarly be employed to overcome this objectionable characteristic by appropriate disposition within a bomb bay of orifice assemblies of the proper size and shape to overcome the adverse aerodynamic characteristics of the stores located within a bomb bay immediately after their release.

Moreover, although the instant invention is described herein as applied specifically to the correction of nose-down pitching moments of stores at the instant of release, it is to be understood that it could also be applied to other undesirable aerodynamic characteristics at the instant of separation of aerodynamic bodies such as a nose-up pitching moment which could be compensated for by locating a suitable orific forward of the center of gravity of a body demonstrating such a characteristics.

Thus, the instant invention provides a reliable, compact, lightweight means for controlling the position of a store relative to an aircraft from which it has been released during the brief critical interval immediately after such release, which means is mechanically uncomplicated and hence reliable in operation, requires a minimum of maintenance between successive operations, includes no expendable parts released with the store, avoids the application of highly concentrated loads either to the store or to the supporting aircraft, and may be installed upon an aircraft without interference with its aerodynamic characteristics since this means includes no components which must be disposed externally of an aircraft.

Obviously, other modifications and variations of the present invention are possible in the light of the above teachings. It is therefore to be understood that within the scope of the appended claims the invention may be practiced other than as specifically described.

What is claimed is:
1. In an aircraft having an exterior airframe undersurface portion adapted to have a ballistic weapon releasably attached thereto comprising, means forming a fluid duct in the aircraft terminating in an outlet orifice opening to the airframe undersurface portion adjacent the after end of the ballistic weapon for directing a stream of air towards the ballistic weapon transversely to the slip-stream of the aircraft at the airframe undersurface portion, turbojet engine means having air compressor means connected to the aircraft, compressor airbleed means connecting said air compressor means with said fluid duct means, valve means in said fluid duct means adapted to control the flow of air through said outlet orifice means, and means for controlling and operating said valve means.

2. In an aircraft as set forth in claim 1, wherein said valve control means includes a reversible electric motor, drive transmission means driven by said reversible electric motor and operating said valve means for opening and closing the same.

3. In an aircraft as set forth in claim 2, which further comprises, valve opening and position selector means to permit the selection of the amount said valve means shall be opened and accordingly controls the flow of air out of said orifice means, and linkage means connecting said selector means with said transmission means.

4. An aerodynamic jet-stream spoiler device for an aircraft adapted to carry an externally mounted store comprising, means forming an outlet orifice located in the aircraft and communicating with the exterior undersurface of the aircraft adjacent the externally mounted store, said outlet orifice means being arranged to direct a stream of air substantially perpendicular to the slip stream of the externally mounted store and thence against the afterend portion of the externally mounted store, means forming a duct communicating with said outlet orifice means and adapted to continuously communicate with a supply of high velocity air, means adjacent said duct means for heating the air transmitted through said duct means and said outlet orifice means to a temperature level substantially higher than the temperature of the slip stream air, and normally closed remote controlled valve means interposed in said duct means and adapted to be opened prior to and during the release of the externally mounted store from the aircraft for the purpose of countering adverse aerodynamic characteristics of the externally mounted store during release.

References Cited in the file of this patent
UNITED STATES PATENTS

| | | |
|---|---|---|
| 790,664 | Smith | May 23, 1905 |
| 2,451,008 | Williams | Oct. 12, 1948 |
| 2,479,746 | l'Anson | Aug. 23, 1949 |
| 2,674,843 | Lombard | Apr. 13, 1954 |
| 2,714,999 | Thieblot et al. | Aug. 9, 1955 |
| 2,726,576 | Musser | Dec. 13, 1955 |
| 2,791,387 | Weinberg | May 7, 1957 |
| 2,829,561 | Granfelt | Apr. 8, 1958 |
| 2,905,055 | Camp et al. | Sept. 22, 1959 |